(12) United States Patent
Guidry

(10) Patent No.: US 9,039,497 B1
(45) Date of Patent: May 26, 2015

(54) PORTABLE AND ARTICULABLE FEATHER PLUCKING MECHANISM

(71) Applicant: Shannon K. Guidry, Lafayette, LA (US)

(72) Inventor: Shannon K. Guidry, Lafayette, LA (US)

(*) Notice: Subject to any disclaimer, the term of this patent is extended or adjusted under 35 U.S.C. 154(b) by 0 days.

(21) Appl. No.: 14/290,388

(22) Filed: May 29, 2014

(51) Int. Cl.
A22C 25/02 (2006.01)
A22C 21/02 (2006.01)

(52) U.S. Cl.
CPC ............................ *A22C 21/02* (2013.01)

(58) Field of Classification Search
USPC ................................................ 119/843–846
See application file for complete search history.

(56) References Cited

U.S. PATENT DOCUMENTS

| | | | |
|---|---|---|---|
| 2,714,222 A | 8/1955 | McKendree | |
| 3,483,589 A * | 12/1969 | Smorenburg | 452/91 |
| 4,037,565 A * | 7/1977 | Ledwell, Jr. | 119/846 |
| 4,508,062 A * | 4/1985 | Berry et al. | 119/846 |
| 4,513,689 A * | 4/1985 | Berry et al. | 119/846 |
| 4,766,850 A * | 8/1988 | O'Neill | 119/846 |
| 5,106,333 A * | 4/1992 | Van Dorn et al. | 452/91 |
| 5,259,811 A * | 11/1993 | Berry | 452/183 |
| 5,325,820 A * | 7/1994 | Briggs et al. | 119/846 |
| 5,361,727 A * | 11/1994 | Berry | 119/846 |
| 5,605,503 A * | 2/1997 | Martin | 452/173 |
| 5,699,755 A * | 12/1997 | Wills et al. | 119/846 |
| 5,706,765 A * | 1/1998 | Horton | 119/846 |
| 5,853,320 A | 12/1998 | Wathes | |
| 5,856,620 A * | 1/1999 | Okada | 73/514.32 |
| 5,863,245 A * | 1/1999 | Elduayen et al. | 452/88 |
| 5,975,029 A * | 11/1999 | Morimoto et al. | 119/843 |
| 6,305,327 B1 * | 10/2001 | Bounds, Jr. | 119/713 |
| 6,564,751 B2 * | 5/2003 | Anderson et al. | 119/845 |
| 6,976,454 B2 * | 12/2005 | Cattaruzzi | 119/846 |
| 7,648,412 B2 * | 1/2010 | Kjeldsen | 452/88 |
| 7,950,986 B2 * | 5/2011 | Kelly et al. | 452/77 |

FOREIGN PATENT DOCUMENTS

WO 94/28731 12/1994

OTHER PUBLICATIONS

FowlPlucker Portable DIY Kit (thefowlplucker.com).
Easy-Pluck Duck Plucker (pluckwitheasypluck.com).

* cited by examiner

*Primary Examiner* — Richard Price, Jr.

(57) ABSTRACT

A portable plucking mechanism for birds, comprising a rotating head with a plurality of flexible protrusions operably connected to a motor, a plurality of arm members, and an attachment mechanism optionally comprising a trailer hitch receiver and an electrical connection to a power source. These components are connected with a plurality of articulable joints, allowing for optimal positioning of the rotating head (at the distal end of an arm member) in space relative to the position of the attachment mechanism (at the proximal end of another arm member). Thus, the user has convenient access regardless of terrain or obstacles, the ability to easily reposition the head, and the ability to manipulate the body of the bird with both hands, to frictionally engage a plurality of feathers with the rotating flexible protrusions, while minimizing damage to the meat of the bird.

17 Claims, 2 Drawing Sheets

PORTABLE AND ARTICULABLE FEATHER PLUCKING MECHANISM

FIELD

Embodiments usable within the scope of the present disclosure relate, generally, to feather pluckers, and more specifically, to an apparatus designed for use by hunters in situ for rapidly and efficiently de-feathering birds in the field, having features for engaging with transport thereto.

BACKGROUND

Automatic dry-plucking devices for birds typically operate by motorized rotation of a drum acting as an attachment point for a plurality of fingers composed of an elastic substance, such as rubber. These elastic fingers may contain a number of grooves, spikes, or other shapes in order to increase surface area. A bird is then placed in physical contact with the fingers while rotating at high speeds. The resulting friction between the contact of the fingers with the feathers acts to quickly and efficiently pluck the feathers out of the bird. Some examples of fingered automatic plucking devices known in the art are, e.g., U.S. Pat. No. 3,273,198, U.S. Pat. No. 5,863,245.

Most of the literature involving fingered automatic plucking devices is directed at fixed, industrial poultry processing, involving multiple drums and large-scale assembly line embodiments. However, individual game hunters may often wish to pluck birds in the field, both for the sake of efficiency and to avoid the need for clean-up at camp or indoors.

Alternative products exist which are driven by portable motors, such as small-scale drums which can attach to cordless electric drills. However, these products still present a number of disadvantages: they require the use of one hand to position the drum with only one other free to manipulate the position of the bird unless bolted or otherwise fixed onto a surface, at which point they lose the advantage of easy portability and cannot be articulated. In addition, a surface suitable for attachment is not always readily available in every duck blind or camp site; or if available, it may be remotely or inaccessibly positioned.

Therefore, a need exists for a dry-plucking device for birds usable in the field which retains its portable character while still allowing for both hands to manipulate the bird. Additionally, a need exists for a device that can be fixed onto a surface while still allowing for the plucker drum itself to be positioned in space in order to compensate for the irregular and unpredictable elevations and environments encountered in the course of bird hunting. The present invention meets those needs.

BRIEF DESCRIPTION OF THE DRAWINGS

In the detailed description of various embodiments usable within the scope of the present disclosure, presented below, reference is made to the accompanying drawing, in which.

Figure 1:
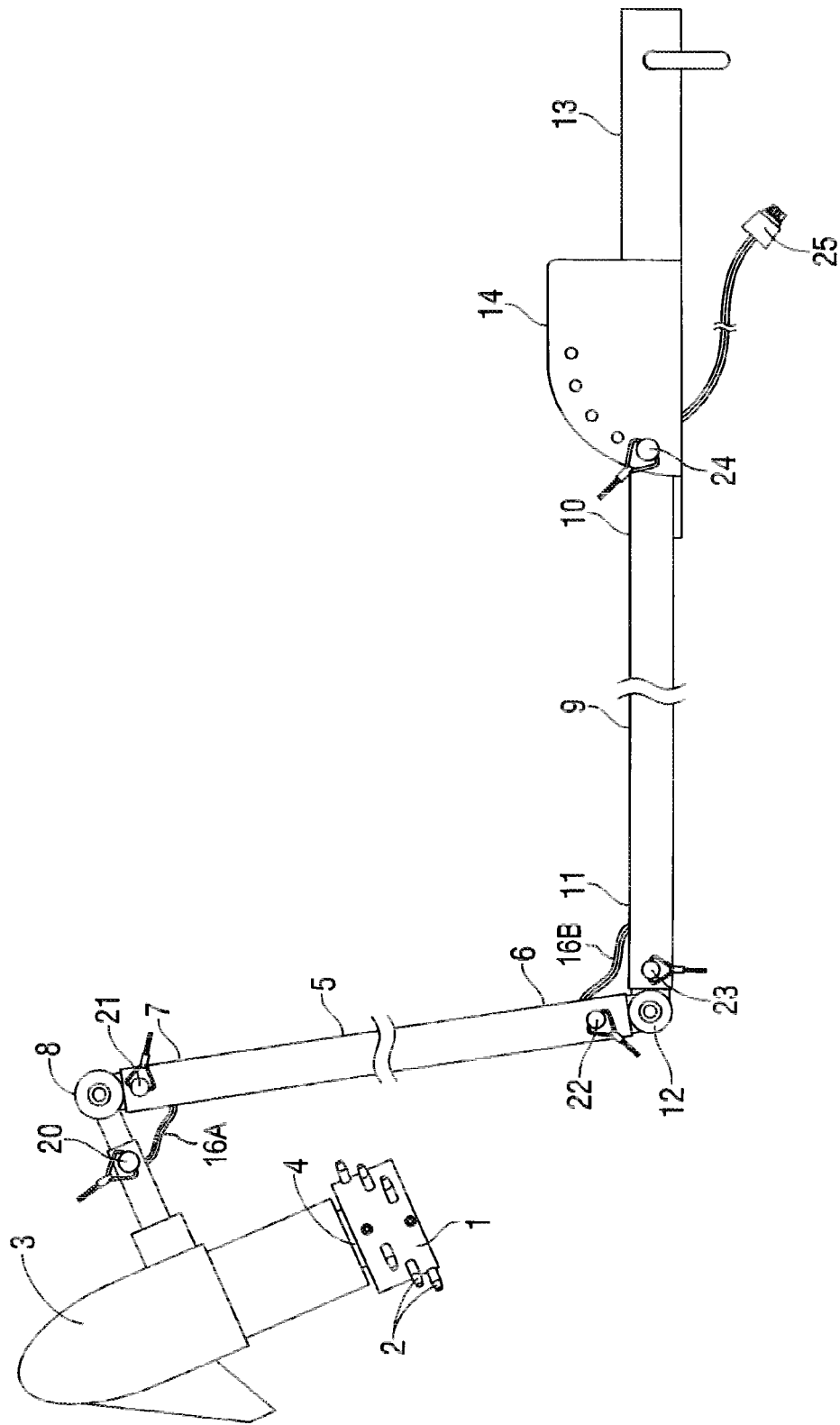
FIG. 1 depicts a side view of an embodiment of a two-member apparatus usable within the scope of the present disclosure.

One or more embodiments are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description herein is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments of the invention to one of skill in the art, but are not intended to be manufacturing level drawings or renditions of final products and may include simplified conceptual views as desired for easier and quicker understanding or explanation of the invention. As well, the relative dimensions and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Embodiments usable within the scope of the present disclosure relate generally to a rotating head with a plurality of flexible protrusions attached, wherein the flexible protrusions can be formed from a generally elastic material (e.g., rubber, a synthetic elastomer, etc.). The rotating head can be operably connected to a motor, and the motor can rotate the rotating head to cause the protrusions to pluck (i.e., remove) the feathers of a bird by making frictional contact between the protrusions and the feathers.

Embodiments also include an attachment mechanism, whereby the plucking mechanism may be attached to a vehicle, a watercraft, a fixed structure, such as a bench at a camp site, or any other point capable of bearing weight. The embodiments also include a plurality of arm members, each member comprising a distal end and a proximal end, wherein said distal end is defined as the end nearer to the motor and said proximal end is defined as the end nearer to the attachment mechanism. The motor, the plurality of members, and the attachment mechanism can all be connected to one another by articulable joints. This allows the rotating head of the plucking mechanism to be moved along multiple axes vertically and horizontally, such that it can be positioned in space around natural obstacles or other attachments, for maximum accessibility and convenience. As such, the user is free to handle and manipulate the body of the bird so as to maximize friction with the rotating protrusions while avoiding damage to the meat. The attachment mechanism ensures that the plucking mechanism remains steady and fixed to the point of attachment.

In an embodiment, the articulable joints may additionally comprise pin-set locks, allowing the user to optimally position the plucking mechanism relative to the space of each environment and then fix it in position so that the plucking mechanism can be used repeatedly while plucking multiple birds. These articulable joints may comprise any type of articulable mechanical connection, such as hinge joints, sliding joints, cylindrical joints, or ball joints. Other embodiments within the scope of the present disclosure can comprise differing kinds of joints (e.g., the attachment mechanism may be connected with a pin-set hinge joint for maximum strength, while the motor may be connected with a free-moving ball joint for maximum articulation).

Referring now to FIG. 1, a side-on view of an embodiment usable within the scope of the present disclosure is shown. The depicted embodiment is shown with two arm members depicted as a tube or hollow shaft, a first arm member (5) comprising a first proximal end (6) and a first distal end (7), and a second arm member (9) comprising a second proximal end (10) and a second distal end (11). The first distal end (7) is shown connected to the motor (3) via a first articulable joint (8), which can in turn be locked into place using pin-set locks (20) and (21). The motor (3) has an operable connection (4) with the rotating head (1), which contains a plurality of flexible protrusions (2) designed to make frictional contact with the bird during plucking. While the protrusions comprise rubber in the preferred embodiment, any flexible material with sufficient friction to engage the feathers during rotation can be used.

In the depicted embodiment, the first arm member (5) is connected with the second arm member (9) via a second articulable joint (12) located on the proximal end of the first arm member (6) and the distal end of the second arm member (11). The second joint (12) also comprises pin-set locks (22), (23). The second arm member terminates on the second proximal end (10) at a third articulable joint (14) comprising another pin-set lock (24) that can connect the second arm member (9) with the attachment mechanism (13).

In the depicted embodiment, the plurality of arm members additionally comprise internal spaces for electrical wiring (16A), (16B) to extend therethrough. The wiring can enter the internal space through small holes near each articulable joint, operably connecting the motor (3) on the first distal end with an electrical power source near the attachment mechanism (13). This removes the need for a drainable battery in the motor and allows a power source to be placed nearer to the fixed attachment point, thereby allowing free positioning of the motor and rotating head assembly.

In the depicted embodiment, the attachment mechanism (13) comprises a trailer hitch attachment for attaching the apparatus to a truck, sports-utility vehicle, all-terrain vehicle, or other automobile. Such an attachment negates the need for a fixed attachment point at the hunting site by integrating the apparatus with the vehicle itself. Embodiments may further integrate the apparatus with the vehicle by drawing power through an electrical connection (25) to the vehicle through the use of a rear electrical socket or, if such rear sockets are unavailable, via other connections to the vehicle battery, such as a 12V cigarette lighter plug or alligator clips.

Attachment mechanisms in alternative embodiments (not shown) may include a clamp or bracket mounted to the side of the vehicle in the case where the trailer hitch is already occupied, or when the vehicle comprises a boat. Other embodiments' attachment mechanisms may comprise bolts or screws in the case of particularly rough terrain.

In use, when the depicted embodiment is used to pluck birds in the field, the articulable joints (8), (12), and (14) can be pivoted and then locked prior to use depending on the particular conditions of each individual field site or camp site. Some embodiments (not shown) of the invention may include an on/off switch for convenience, although the location of such a switch is not intended to be limiting and may be located at any point along the electrical connection between the motor (3) and the power source. A simple embodiment, such as a self-assembly kit, may exclude the switch in favor of switching at the power source.

It should be noted that while the depicted embodiment includes two arm members, other embodiments may include a plurality of intermediate arm members. These intermediate arm members will be structured similarly to the first and second arm members, and located therebetween. Each intermediate arm member may additionally comprise at least one intermediate articulable joint linking the intermediate arm member with either the first arm member, the second arm member, or another intermediate arm member, such that the intermediate arm members add additional points of articulation along the arm of the plucking mechanism.

Figure 2:
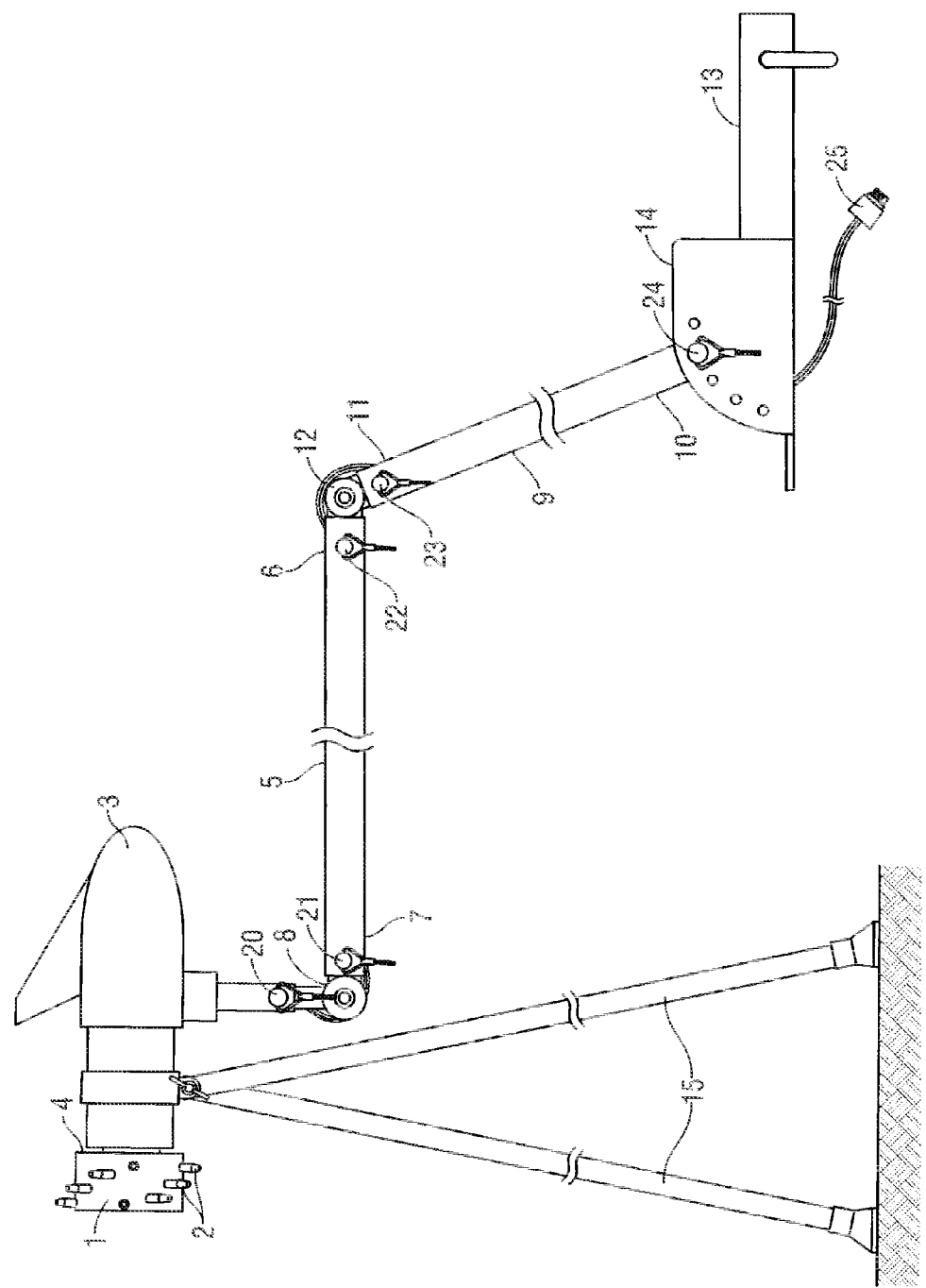
FIG. 2 depicts a side view of an embodiment of a two-member apparatus with a stabilizing stand, usable within the scope of the present disclosure.

It should also be noted that while the arm members of the depicted embodiment are of roughly equal dimensions, the invention is not intended to be limited thereby, and the first, second, and intermediate arm members of various embodiments may comprise varying lengths and diameters, with such variations capable of conferring differences in utility. For instance, an embodiment with shorter members would allow the plucking mechanism to hover the rotating head over the dropped tailgate of a truck to form an impromptu plucking work-bench at a site with no such structures. In an embodiment, depicted in FIG. 2, members with longer lengths may result in the plucking mechanism additionally comprising a stabilizing stand (15) attached to the head (3) or one of the arm members (5), (9). Said stabilizing stand (15) would provide supplementary support to the attachment mechanism. This in turn would allow embodiments with longer arm members to reach, e.g., a raised duck blind from a parked all-terrain vehicle supplying power. Other embodiments may utilize varying diameters combined with the internal space of the members, to enable telescoping members or telescoping relationships between members for ease of storage and further control of positioning.

In another embodiment (not shown), the invention may be attached to a boat or other watercraft, and adapted for on-site use in hunting waterfowl through various modifications. For instance, the apparatus may be substantially water-proofed through, e.g., the use of silicone sealant to segregate the internal wiring spaces, heat-shrink polyolefin tubing for the external wiring (16A), (16B) and the electrical connections (25), or the application of rust-proof zinc compounds to the arm members (5), (9). Further modifications may include the use of a trolling motor, or the use of pontoons in the stabilizing stand (15).

Embodiments described herein can thereby provide hunters with portable dry-plucking easily integrated with vehicles, allowing the free positioning of the rotating head to an angle and position in space most advantageous to the user, while retaining the ability to keep both hands free for manipulating the bird.

While various embodiments usable within the scope of the present disclosure have been described with emphasis, it should be understood that within the scope of the appended claims, the present invention can be embodied other than as specifically described herein.

What is claimed is:
1. An apparatus for plucking birds, comprising:
  a rotating head with a plurality of flexible protrusions extending therefrom, wherein the plurality of protrusions make frictional contact with a plurality of feathers;
  a motor operably connected to said rotating head, wherein the motor rotates the rotating head and causes the protrusions to pluck out the plurality of feathers;

a first arm member consisting of a first proximal end and a first distal end, attached to said motor on the first distal end by a first articulable joint;

a second arm member consisting of a second proximal end and a second distal end, attached to the proximal end of said first arm member by a second articulable joint on the second distal end; and a trailer hitch connection, attached to the proximal end of the second member.

2. The apparatus of claim 1, wherein said trailer hitch connection is attached to the second proximal end of the second arm member by a third articulable joint.

3. The apparatus of claim 1, further comprising an electrical connection for use with an automobile, a generator, or other power source.

4. The apparatus of claim 3, wherein said first arm member and said second arm member further comprise an internal space for electrical wiring operably connecting the motor to said power source.

5. The apparatus of claim 1, wherein said motor additionally comprises a battery and draws power therefrom.

6. The apparatus of claim 1, wherein at least one of said first and second articulable joints additionally comprises a pin-set locking mechanism.

7. The apparatus of claim 1, wherein said apparatus is substantially waterproof.

8. The apparatus of claim 1, further comprising a stabilizing stand.

9. The apparatus of claim 1, wherein said motor is a trolling motor.

10. An apparatus for plucking birds, comprising:

a rotating head with a plurality of flexible protrusions extending therefrom, wherein the plurality of protrusions make frictional contact with a plurality of feathers;

a motor operably connected to said rotating head, wherein the motor rotates the rotating head and causes the protrusions to pluck out the plurality of feathers;

a trailer hitch connection; and a first arm member, a second arm member, and at least one intermediate arm member comprising a proximal end and a distal end, wherein said first arm member is attached via a first articulable joint to said motor on the distal end and at least one intermediate arm member on the proximal end, said second arm member is attached via a second articulable joint to said trailer hitch connection on the proximal end and at least one intermediate arm member on the distal end, and wherein each intermediate arm member is attached via an intermediate articulable joint to at least two of said first arm member, said second arm member, or another intermediate arm member.

11. The apparatus of claim 10, further comprising an electrical connection for use with automobile, a generator, or other power source.

12. The apparatus of claim 11, wherein said first arm member, second arm member, and at least one intermediate arm member further comprise an internal space for an electrical wiring operably connecting the motor to said power source.

13. The apparatus of claim 10, wherein said motor further comprises a battery and draws power therefrom.

14. The apparatus of claim 10, wherein at least one of said articulable joints additionally comprises a pin-set locking mechanism.

15. The apparatus of claim 10, wherein said apparatus is substantially waterproof.

16. The apparatus of claim 10, further comprising a stabilizing stand.

17. The apparatus of claim 10, wherein said motor is a trolling motor.

\* \* \* \* \*